Patented July 1, 1941

2,247,364

UNITED STATES PATENT OFFICE 2,247,364

ALKYL ETHERS OF DURO-HYDROQUINONE AND PROCESS FOR PRODUCING THE SAME

Erhard Fernholz, Elizabeth, N. J., assignor to Merck & Co. Inc., Rahway, N. J., a corporation of New Jersey No Drawing. Application June 4, 1937, Serial No. 146,523

9 Claims. (Cl. 260—613)

This invention relates to certain new and useful ethers derived from durohydroquinone (I)

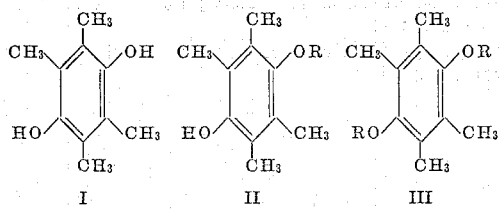

which are generally characterized by the Formulas II and III, wherein R is an alkyl radical, and processes for their production.

The preparation of ethers of durohydroquinone has not heretofore been described. The applicant has now prepared a series of them by reacting upon durohydroquinone with an alkyl halide, preferably in the presence of an alkaline material which is capable of removing the hydrogen halide by the formation of a salt. Depending on the proportions of the reagents used, the mono-ethers (II) or the di-ethers (III) are produced in different proportions.

Similar ethers of a dihydric phenol have hitherto been prepared. For example, U. S. Patent No. 1,883,952 relates to such mono-ethers of hydroquinone. However, the different nature of durohydroquinone in which the phenolic chemical properties are weak or even absent, have been found to require modifications in the process for the production of its alkyl ethers.

The mono-ethers of durohydroquinone which are disclosed in the instant application also have some new and unexpected properties. The solubility in alkali which the mono-ethers of hydroquinone possess is absent in the durohydroquinone mono-ethers. It is, therefore, not possible to use the conventional methods which have hitherto been employed for the isolation of the mono-ethers of polyhydric phenols which depend for their effectiveness upon the acid properties of such ethers.

The mono-ethers of durohydroquinone with higher alkyls, herein disclosed, on the other hand, are neutral substances, insoluble in alkali. They are crystalline compounds, soluble in common organic solvents, and can readily be distilled under a high vacuum.

It has been found by the applicant that he could utilize and conveniently adapt these properties to his method of producing the new series of compounds herein described.

It has been found that the new mono-ethers of the instant application are also chemically characterized by a high reducing power. For instance, silver nitrate is reduced to metallic silver in alcoholic solution on gentle heating. They are also relatively non-toxic. Possessing as they do, a marked anti-oxidant action and, being soluble in lipoids, they may be advantageously employed for the stabilization of fats and other similar organic material against oxidation.

These synthetic mono-ethers of the higher aliphatic alcohols are structurally closely related to natural tocopherol, and are believed to possess in varying degree the physiological activities thereof. They should, therefore, also find useful adaptation in appropriate forms of pharmaceutical preparations.

The di-ethers, which are concomitantly produced in the processes herein described for the production of the mono-ethers, are also serviceable as intermediates for ultimate conversion to the corresponding mono-ethers by appropriate processes as will further appear.

The examples given below deal with the preparation of ethers of such higher alcohols as are readily obtainable from fatty acids. They are presented as preferred methods, by way of illustration, and not of limitation. It will be readily obvious, to those skilled in the art, that other alkyls of a similar molecular weight can also be employed and that other variations in relative quantities and materials may be made without departing from the scope and spirit of the invention.

EXAMPLES

1. Durohydroquinone octadecyl ethers

A suspension of 8.3 g. of durohydroquinone and 24 g. of octadecyl iodide in 50 cc. of alcohol is refluxed on the steam bath in a slow stream of hydrogen and with thorough stirring. To this mixture is then added in small drops and within 15 minutes 55 cc. of alcoholic N—KOH. The refluxing is continued for several hours. Four liters of alcohol are then added and the mixture boiled for about an hour. Durohydroquinone-di-octadecyl ether crystallizes out in white leaflets. It is filtered off after cooling. If the crystals should contain mono-ether, which can easily be tested with silver nitrate, the last step of the procedure may be repeated.

The di-octadecyl ether thus prepared melts at about 96° C. The alcoholic filtrates contain the mono-ether. For its isolation, the solution is evaporated nearly to dryness, and the organic residue then taken up with ether. The ethereal solution is washed with water and Claisen solution (equal parts of 50% aqueous KOH and methanol) to remove unchanged durohydroquinone. The ether solution is distilled and the residue subjected to a distillation under high vacuum. At a pressure of about 0.03 mm. the durohydroquinone mono-octadecyl ether distills rapidly at a bath temperature of 195° C. Before the mono-ether is formed there is a fore-run consisting of yellow duroquinone and octadecyl iodide.

The already fairly pure mono-ether thus derived may then be further purified by re-crystallization from alcohol. It consists of white leaflets melting at about 105° C.

According to this procedure, the mono- and the di-ethers are obtained in approximately equal amounts.

2. Durohydroquinone cetyl ethers

To a boiling and thoroughly stirred mixture of 8.3 g. of durohydroquinone, 14 g. of dried and powdered potassium carbonate, and 300 cc. of acetone, there is gradually added a mixture of 13 g. of cetyl iodide ($C_{16}H_{33}I$) and 300 cc. of acetone. Refluxing is continued for several hours. Water is then added and the precipitated ethers are filtered. The separation of the di-ether from the mono-ether is then carried out in analogy with Example 1, taking advantage of the relatively great difference of their solubilities in alcohol.

Durohydroquinone-dicetyl ether crystallizes in white leaflets, melting at 89° C.

The mono-cetyl ether, recrystallized from alcohol, melts at 101° C. It distills rapidly at a bath temperature of about 190° C. and about 0.05 mm. pressure.

The production of mono-ethers of durohydroquinone specifically has been described above. It has been shown that the method thus described produces a mixture of di-ethers (III) and mono-ethers (II) of the hydroquinone (I). The method of their separation for the production of the desired mono-ethers has also been explained.

The mono-ethers of durohydroquinone with higher alkyls as indicated possess particular interest because the tocopherols belong to this group. It was, therefore, important to convert these di-ethers (III) which are obtained as a by-product in the processes of the examples, into the more valuable mono-ethers (II).

A number of methods, suggested by investigations of previous inventors, were, therefore, studied and it was found that the cleavage of di-ethers or durohydroquinone by means of aluminum chloride in a suitable solvent gave most satisfactory results. This reaction may be illustrated by the following formula:

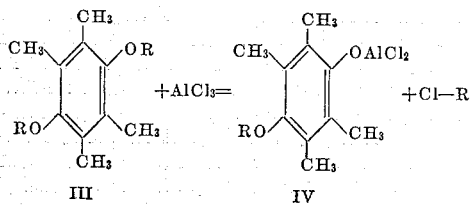

III    IV

The hypothetical substance (IV) is subsequently hydrolyzed by water to yield the corresponding mono-ether (II).

By this process of the conversion of the intermediate di-ethers to mono-ethers, very good yields of the latter are obtained. It may, therefore, depending upon service conditions, be advisable to direct the alkylation methods described in the examples so as to obtain a relatively high yield of di-ethers in the first place, and then to produce the mono-ether therefrom by the splitting method as described herein.

The reaction is of general application for the ethers of durohydroquinone with higher alkyls, and a single example will satisfactorily illustrate the general method as applicable to other alkyl ethers of durohydroquinone of the series.

EXAMPLE

To a solution of 36 g. of durohydroquinone dicetyl ether in 500 cc. of dry benzene, there is added 9 g. of anhydrous aluminum chloride. The mixture is refluxed for about 24 hours. The solution undergoes a series of changes of color, turning from orange over green to a bluish tint. The benzene solution thus treated is then washed successively with hydrochloric acid, alkali, and water. It is then evaporated. The residue is distilled in a high vacuum. At a pressure of about 0.05 mm. there is obtained a small amount of duroquinone at a bath temperature of 120° C., some cetyl chloride at about 140° C., and the mono-cetyl ether of durohydroquinone distills over at about 190° C. Recrystallized from alcohol, it forms leaflets melting at about 101° C.

I claim:

1. Alkyl di-ethers of durohydroquinone of the general structure

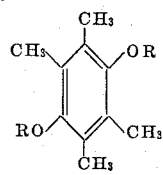

wherein R is an alkyl radical of a higher alcohol derived from a fatty acid.

2. Alkyl mono-ethers of durohydroquinone of the general structure

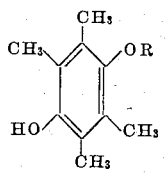

wherein R is an alkyl radical of a higher alcohol derived from a fatty acid.

3. The octadecyl di-ether of durohydroquinone.

4. The octadecyl mono-ether of durohydroquinone.

5. The cetyl mono-ether of durohydroquinone.

6. The reaction product of an alkyl halide of a higher alcohol derived from a fatty acid and durohydroquinone.

7. The reaction product of an alkyl iodide of a higher alcohol derived from a fatty acid and durohydroquinone.

8. A process for producing mono- and di-alkyl ethers of durohydroquinone of the following formulae:

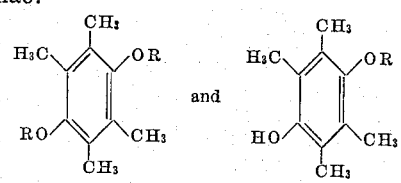

where R is an alkyl radical of a higher alcohol derived from a fatty acid, which comprises dissolving molar quantities of an alkyl halide and durohydroquinone in an organic solvent, refluxing in an inert atmosphere, adding one mol of a substance of the group consisting of alkali metal hydroxides and carbonates, said organic solvent being a solvent for the alkali and non-reactive therewith, continuing refluxing to complete the reaction, precipitating the di-ether by cooling and concentration, and recovering the mono-ether from the mother liquor by distillation.

9. A process for producing mono- and di-alkyl ethers of durohydroquinone having the following formulae:

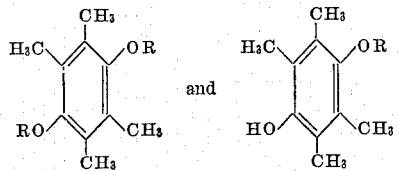

where R is an alkyl radical of a higher alcohol derived from a fatty acid, which comprises the steps of dissolving molar quantities of an alkyl iodide and durohydroquinone in alcohol, refluxing in an inert atmosphere and adding one mol of potassium hydroxide in alcoholic solution, continuing refluxing to complete the reaction, and separating the formed mono- and di-ethers as defined in claim 8.

ERHARD FERNHOLZ.